(12) United States Patent
Brown et al.

(10) Patent No.: US 8,235,368 B2
(45) Date of Patent: Aug. 7, 2012

(54) FINE POSITIONER MODULE

(75) Inventors: Harry Benjamin Brown, Pittsburgh, PA (US); Jason Cory Geist, Pittsburgh, PA (US); Howie Marc Choset, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1105 days.

(21) Appl. No.: 12/119,513

(22) Filed: May 13, 2008

(65) Prior Publication Data
US 2009/0283949 A1 Nov. 19, 2009

(51) Int. Cl.
*B23Q 3/18* (2006.01)
(52) U.S. Cl. .................. 269/58; 269/55; 269/56; 269/60
(58) Field of Classification Search ............ 269/55, 269/56, 58, 60
See application file for complete search history.

(56) References Cited

U.S. PATENT DOCUMENTS

| 4,908,777 | A | | 3/1990 | Wolfe |
| 4,967,126 | A | | 10/1990 | Gretz et al. |
| 5,129,044 | A | * | 7/1992 | Kashiwagi et al. ........... 700/251 |
| 5,420,489 | A | | 5/1995 | Hansen et al. |
| 7,259,535 | B1 | * | 8/2007 | Pastusak et al. ......... 318/568.21 |

* cited by examiner

*Primary Examiner* — Lee D Wilson
*Assistant Examiner* — Shantese McDonald
(74) *Attorney, Agent, or Firm* — Hugh P. Gortler

(57) ABSTRACT

A fine positioner module is used to perform fine positioning of a device that is pressing against a work surface. In some embodiments, the fine positioner module includes a contact member for making contact with a work surface, a position adjustor for using the contact member to move the device along the work surface, and an actuator for relieving pressure of the device against the work surface while the contact member is used to move the device along the work surface.

20 Claims, 5 Drawing Sheets

FINE POSITIONER MODULE

BACKGROUND

In certain processes, a positioning arm is used to position tooling in front of a work surface, and then hold that position while the tooling performs work on the surface. However, achieving a precise end-point position for the tooling can be difficult, especially if the positioning arm has inadequate stiffness due, for example, to extensive travel, a plurality of joints having multiple degrees of freedom, or long, compliant links.

SUMMARY

According to an embodiment of the present invention, a fine positioner module is used to perform fine positioning of a device that is pressing against a work surface. The fine positioner module includes a contact member for making contact with a work surface, a position adjustor for using the contact member to move the device along the work surface, and an actuator for relieving pressure of the device against the work surface while the contact member is used to move the device along the work surface.

DETAILED DESCRIPTION

Figure 1:
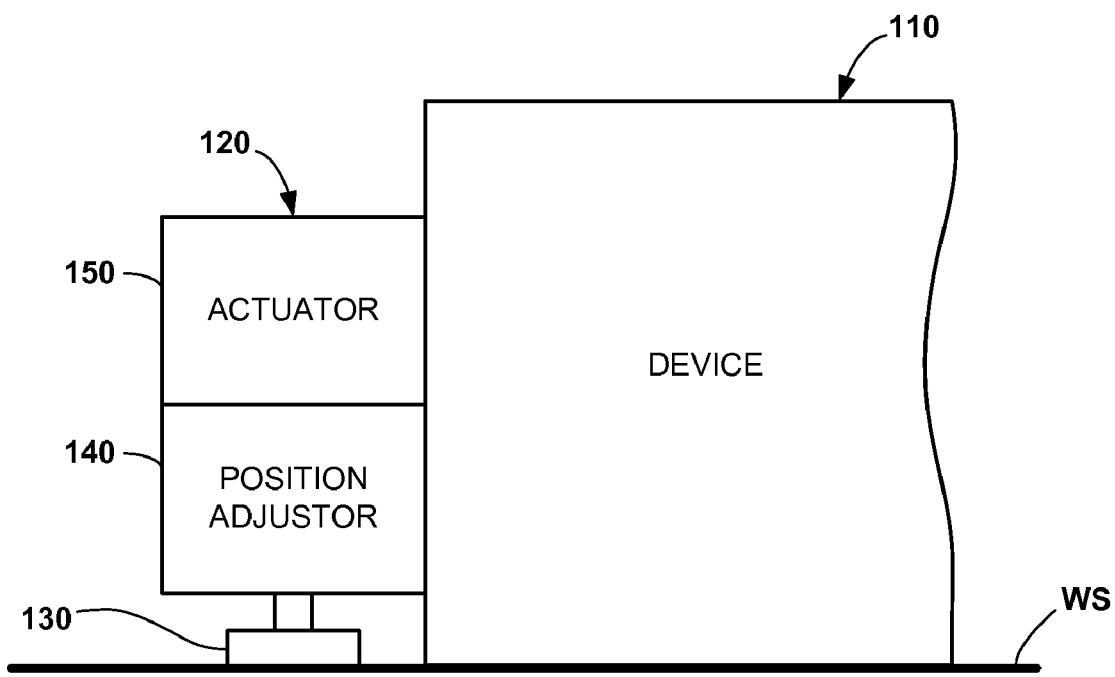
FIG. 1 is an illustration of an apparatus in accordance with an embodiment of the present invention.

Reference is made to FIG. 1, which shows a device 110 pressing against a work surface WS. As one example, the device 110 may be an end effector that is pressed against the work surface WS by a robot arm or other positioning assembly. As another example, the device 110 sits on the work surface WS and, under its own weight, presses against the work surface WS. Friction inhibits the device 110 from moving along the work surface WS.

A fine positioner module 120 is secured to the device 110. The fine positioner module 120 may be attached to a side of the device 110, embedded in the device 110, or otherwise secured to the device 110.

The fine positioner module 120 includes a contact member 130 for making contact with the work surface WS. In some embodiments, the contact member 130 may include a stem that terminates in a pad or foot. However, the contact member 130 is not so limited, and may be another rigid body that makes contact with the surface WS.

The fine positioner module 120 includes an actuator 150 for relieving pressure of the device 110 against the work surface WS. In some embodiments, the actuator 150 can push the contact member 130 against the work surface WS to apply a force normal to the work surface WS. The contact between the device 110 and the work surface WS may be broken momentarily, but then the device 110 falls back into place very quickly. The contact load is largely removed so the device 110 can move freely relative to the work surface WS. The actuator 150 may operate by pneumatic, hydraulic, mechanical, magnetic, or by some other means.

The fine positioner module 120 further includes a position adjustor 140, which is connected through articulation to the contact member 130. The position adjustor 140 uses the contact member 130 to cause relative motion between the device 110 and the work surface WS. The device 110 moves continuously within the contact member's range of motion, but beyond that range it will set and reset itself and take several steps.

The position adjustor 140 causes this relative motion while contact is broken between the device 110 and the work surface WS. This short breaking of contact allows the device 110 to be propelled along the work surface WS. The contact member 130 supports the normal force against the work surface WS, and thereby can generate the traction needed for movement. Thus, the single contact member 130 is not only used to cause motion along the work surface WS, but it also relieves pressure between the work surface WS and the device 110.

In some embodiments, at least one additional fine positioner module 120 may be secured to the device 110. Contact members 130 of all fine positioner modules 120 may be moved synchronously by their position adjustors 140.

As mentioned above, the contact member 130 may include a contact pad at the end of a stem. Such a contact member may be configured to move in an orbital fashion relative to a point (e.g., a center point) of the fine positioner module 120. Orbital motion is advantageous because a single contact element can move along two axes. Orbital motion is especially advantageous because a single actuator (the position adjustor 140) can move the contact member 130 along the two axes.

Figure 5:
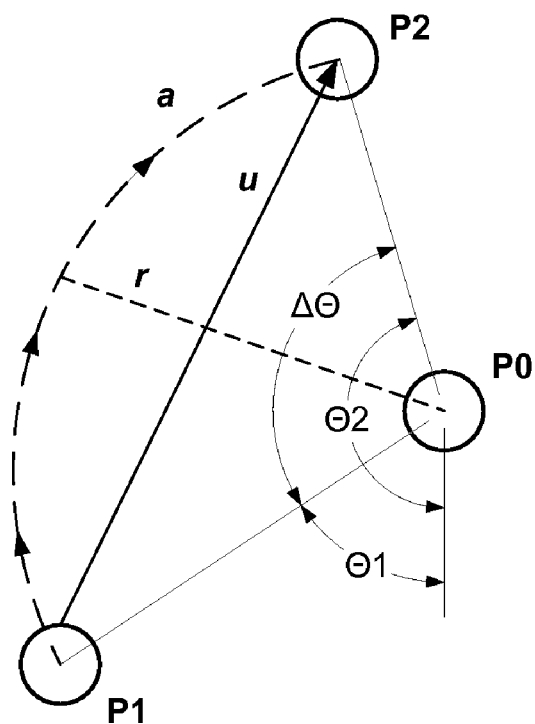
FIG. 5 is an illustration of orbital motion of a contact member in accordance with an embodiment of the present invention.

Additional reference is now made to FIG. 5, which illustrates the orbital motion of the contact member 130 about a central point PO (e.g., the center of the module's body). When the contact member 130 is rotated, it moves in an orbital fashion along an arc a with radius r and angular extent Δθ. The net motion (displacement between the start and end point) is along a chord u. This chord u has a direction and length that depends on starting and ending angles θ1 and θ2. Therefore, any desired motion vector, up to a maximum of twice the radius r can be achieved by proper selection of the starting and ending angles θ1 and θ2. Thus, the fine positioner module 120 and, therefore, the device 110 can be arbitrarily moved by rotating the contact member 130 to starting angle θ1, setting down the contact member 130 at position P1, rotating the contact member to ending angle θ2, and lifting the contact member 130 at position P2. The limit of movement depends on the radius of the orbital motion. The contact member 130 is sized based on the normal force and allowable contact pressure.

Figure 2:
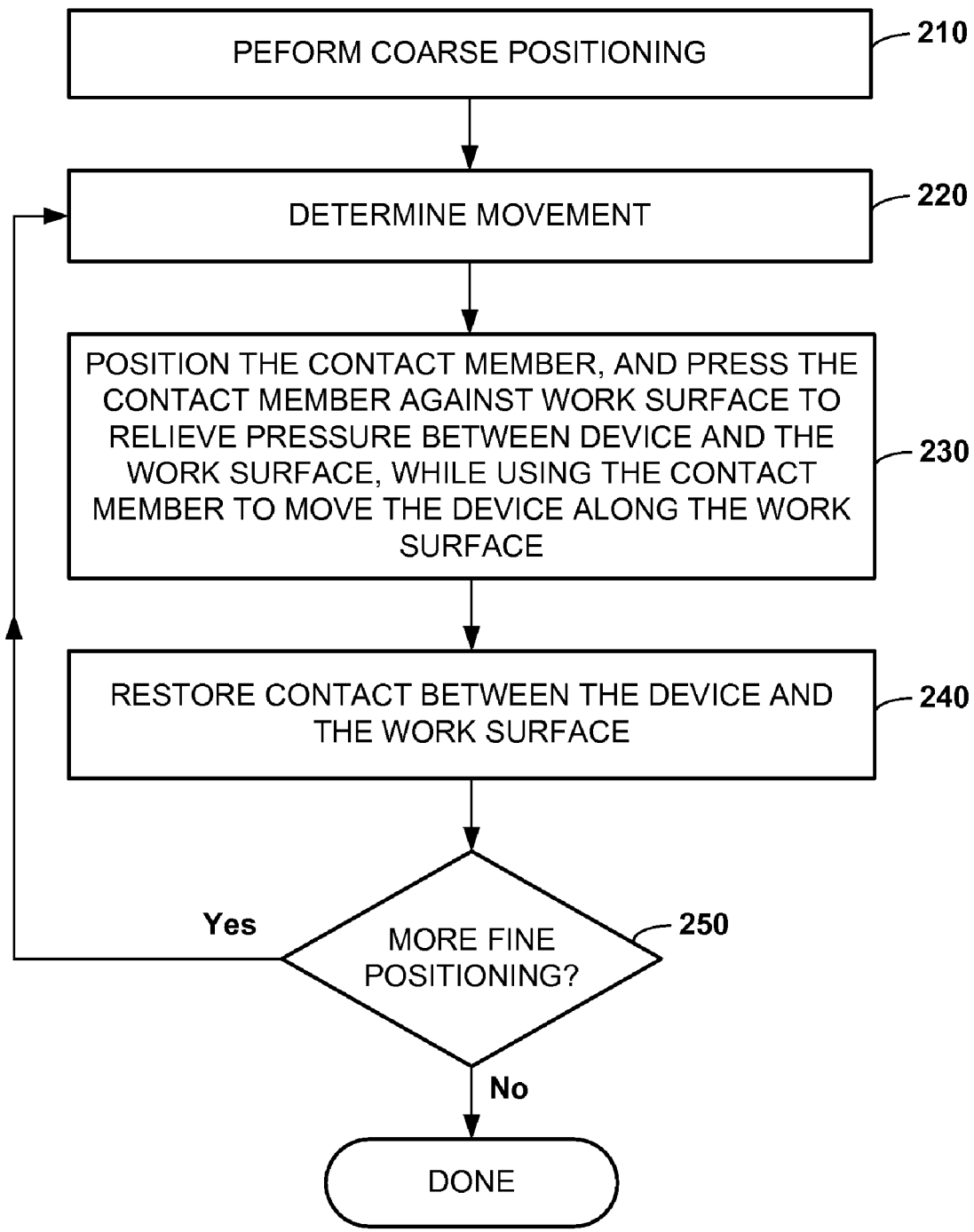
FIG. 2 is an illustration of a method of using an apparatus in accordance with an embodiment of the present invention.

Reference is now made to FIG. 2, which illustrates a method of using the fine positioner module 120 to position the device 110. At block 210, coarse positioning of the device 110 is performed. For instance, if the device 110 is an end effector at the end of a robotic arm, the coarse positioning includes moving the robotic arm so the device 110 is proximate to a target on the work surface WS. At the end of coarse positioning, the device 110 is pressing against the work surface WS.

At block 220, a movement of the contact member 130 is determined. This movement may be based on the measured error of the end-point position prior to the move. For example, if the device 110 is an end effector, the movement may be based on position error between a center point of the end effector and a target on the work surface WS.

At block 230, the position adjustor 140 moves the contact member 130 to a starting position (e.g., the set down position P1), and the actuator 150 causes the contact member 130 to set down and press against the work surface WS, momentarily breaking contact between the device 110 and the work surface WS, while the position adjustor 140 tries to move the contact member 130 orbitally along the work surface WS. However, the contact member 130 doesn't move with respect to the work surface WS. Rather the contact member 130 acts as a pivot. The remainder of the module (the position adjustor 140 and the actuator 150) rotates about this pivot, moving the device 110 along with it. As a result, the device 110 is moved along the work surface WS.

At block 240, at the end of this movement, contact is restored between the device 110 and the work surface WS (e.g., at position P2). Net displacement is along a chord extending from position P1 to position P2. Friction alone may maintain the precise position of the device 110.

At block 250, a determination is made as to whether additional fine positioning will be performed. For example, the position error is remeasured. If the position error is within a specified threshold, the adjustment is complete. If not, the functions at blocks 220-240 are repeated as many times as needed to bring the device to the desired location. Multiple steps may be taken if the initial position error is greater than the maximum travel of the position adjuster 140, or if disturbances prevent the adjusting process from achieving the required precision.

Figure 3:
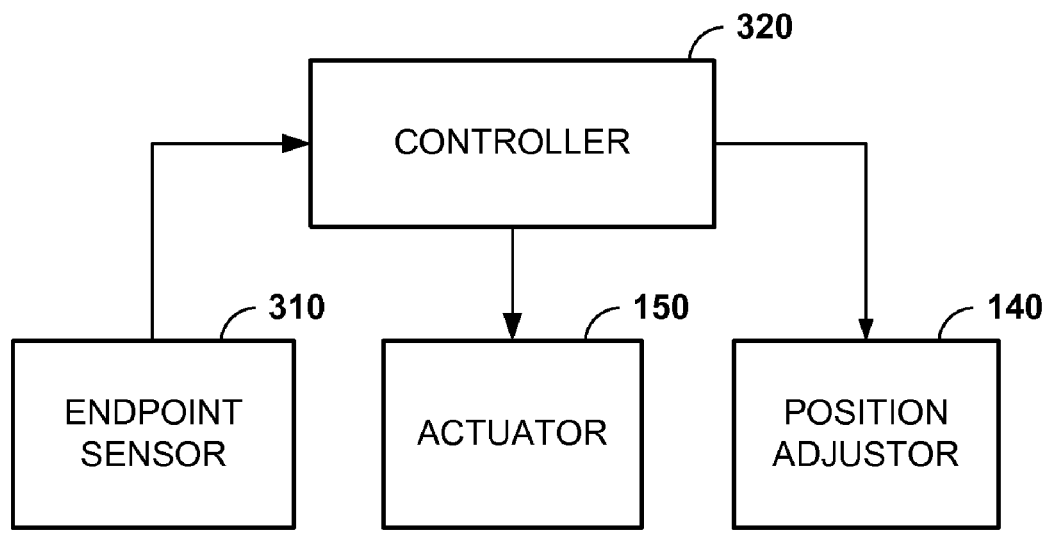
FIG. 3 is an illustration of a control for an apparatus in accordance with an embodiment of the present invention.

Reference is now made to FIG. 3, which illustrates an example of a control for precise positioning of a reference point on the device with respect to a target on the work surface. If the device is an end effector, for instance, the reference point may be a tool center point on the end effector. The target may be, for instance, a hole on the work surface.

An endpoint position sensor 310 such as a camera may be mounted on the device. A camera can create an image showing the reference point with respect to the target on the work surface. In some embodiments, the reference point might be the point that will actually be positioned over the target (e.g., the tool center point).

In other embodiments, however, the view to the actual point might be obstructed. Depending on obstructions of the sensor, the reference point may be a point that is offset from the actual point.

A controller 320 determines the position error between the reference point and the target. For example, the controller 320 analyzes an image of the work surface, including the reference point and the target. The controller 320 calculates the required trajectory of the position adjuster 140 to move the reference point to the target, or it computes a trajectory toward the target if the target is beyond the travel limit of the position adjuster 140. The controller 320 also commands the actuator 150 to move the contact member up and down, and it controls the position adjustor 140 to move the contact member so the device moves toward the target. The controller 320 may be microprocessor-based.

Figure 4:
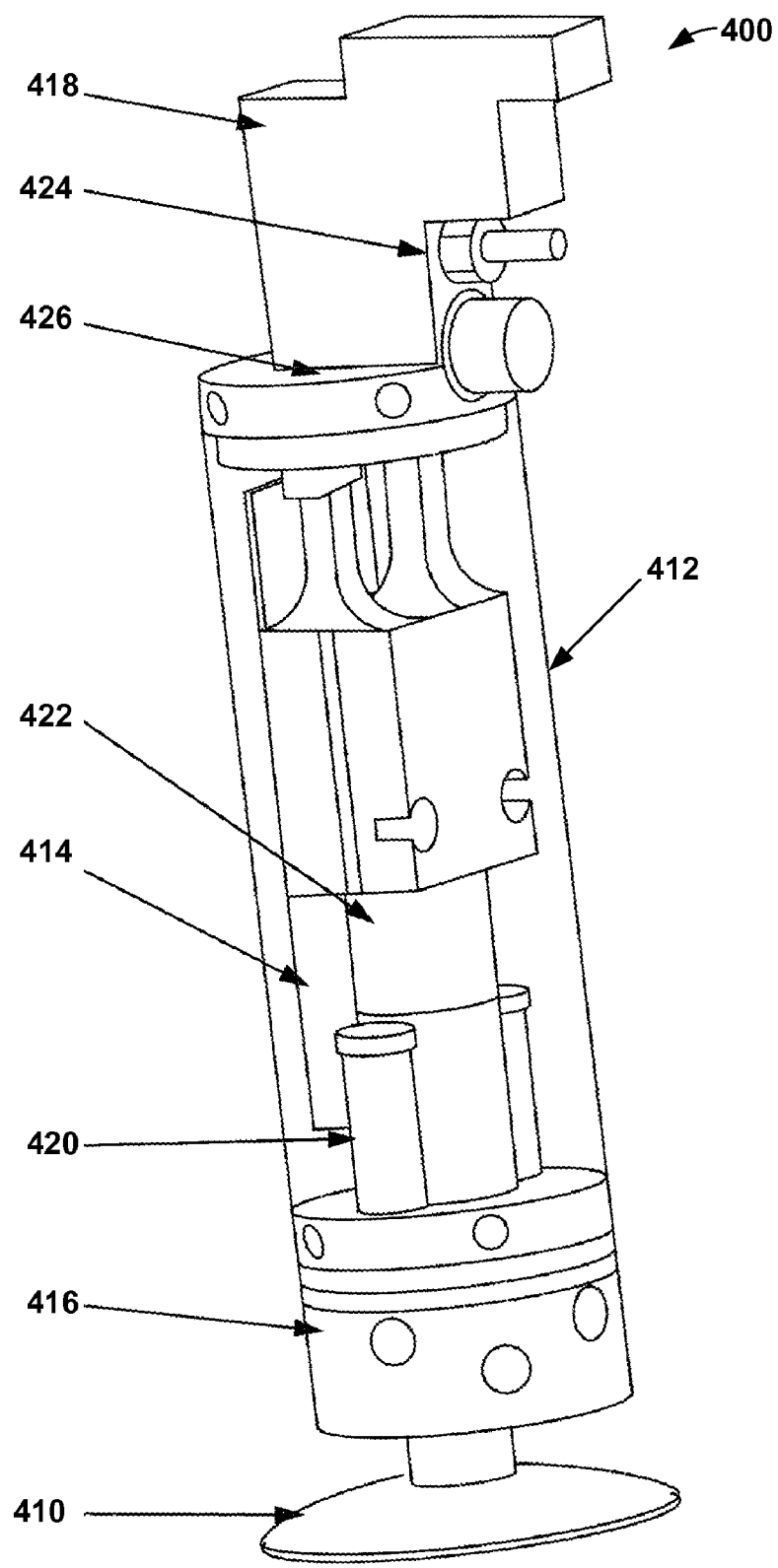
FIG. 4 is an illustration of an apparatus in accordance with an embodiment of the present invention.

Reference is now made to FIG. 4, which illustrates an example of a fine positioner module 400. A contact member 410 extends from the base of a cylindrical housing 412. A micro-processor-based controller 414 commands a piston 416 to force the contact element 410 against the work surface in order to relieve pressure (e.g., momentarily break contact) between the work surface and a device. The piston 416 may be pneumatically operated. Pressurized air may be used as a working fluid. The controller 414 commands a valve 418 to regulate the flow of working fluid into the housing 412 and against the piston 416. Return springs 420 may be used to retract the piston 416 and the contact member 410.

The controller 414 commands a single actuator (e.g., a gear motor) 422 to rotate the contact member 410. When the contact member 410 is rotated, it moves in an orbital fashion to move the device along a work surface. A magnetic encoder (not shown) on the actuator 422 can be used to indicate the orbital position of the contact element 410.

The controller 414 may receive position information about the piston 416 from a linear encoder (not shown), and it may receive pressure information from a pressure sensor (not shown). Together, the linear encoder and pressure sensor can verify that the contact member 410 has made contact with the working surface (e.g., indicated by a pressure rise before the piston reaches its end of travel). The linear encoder may also indicate when the piston 418 is in a retracted or "home" position.

A home position sensor (not shown) may be used to indicate an initial calibration or initial starting position for the orbital motion of the contact member 410. For example, an optical sensor may be used to count tick marks on a disk that rotates with the orbital motion.

The positioner module 400 may also include a connector 424 for receiving air and electrical power, and an electrical feed-through 426 into the (pressurized) housing 412.

A fine positioner module according to an embodiment of the present invention is not limited to the embodiments described above. In some embodiments, the pneumatic piston 416 could be replaced by a hydraulic piston, a lead screw, or a cam mechanism to push down on the contact member 410. This motion could be binary (on/off), or could be precisely controlled to permit a third axis of fine positioning.

In some embodiments, the actuator 150 can control the contact member 130 not only to relieve pressure against the work surface, but also to achieve a third axis of positioning, the distance to the work surface. In this case, the contact member 130 would remain in contact with the work surface to hold the position of the device 110. It would be lifted from contact only for initial positioning (e.g., at the set-down position P1).

In some embodiments, rather than forcing the contact member 130 against the work surface, vibratory motion of the contact member 130 could be used to break the static friction between the device 110 and the work surface, thereby allowing the contact member 130 to move along the work surface. Vibratory motion could be generated, for example, by a rotating eccentric mass attached to the fine positioner module 120.

In some embodiments, small wheels or legs could be used to propel a fine positioner module along one axis or another. Wheels would be able to drive the module continuously over an arbitrary distance without having to reset.

In some embodiments, the adjusting motion could be achieved by separate, orthogonal linear-motion stages using lead screws. Each stage could be used to produce independent motion along an axis. However, the benefit of the orbital motion is that it requires only a single stage, rather than one stage per axis of motion.

Figure 6:
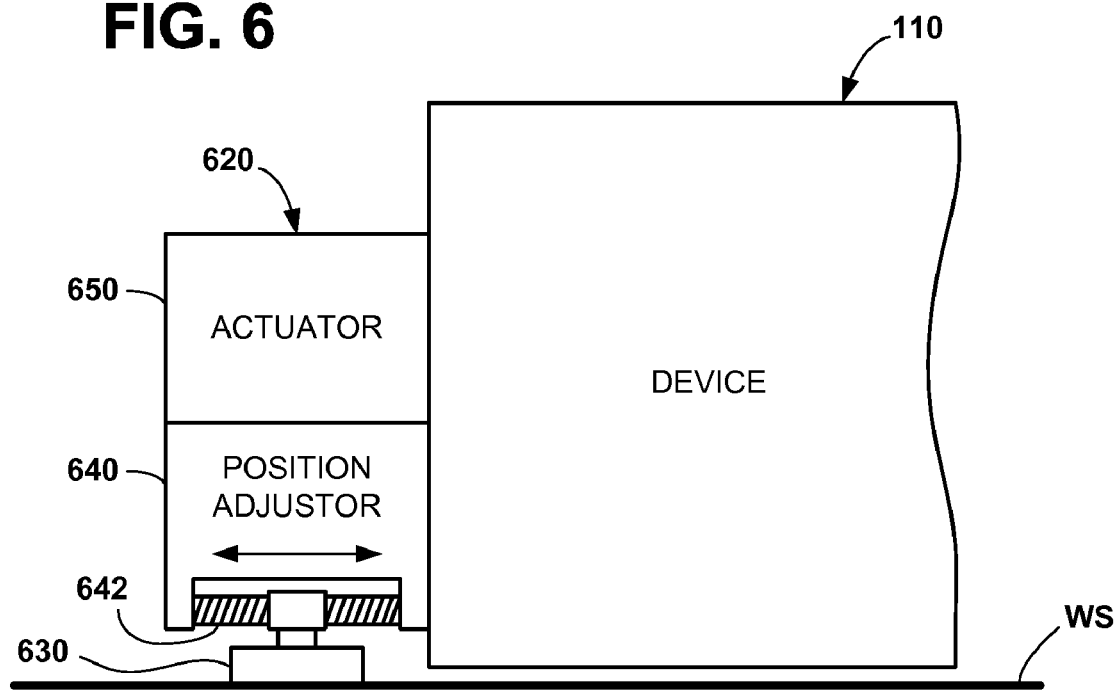
FIG. 6 is an illustration of an apparatus in accordance with an embodiment of the present invention.

Reference is now made to FIG. 6, which illustrates a fine positioner module 620 including a position adjustor 640 and actuator 650. The position adjustor 640 includes orthogonal lead screws 642 for moving a contact member 630 (only one lead screw 642 is illustrated in FIG. 6). Each lead screw 642 moves the contact member 630 in a linear motion (as indicated by the double arrow).

Figure 7:
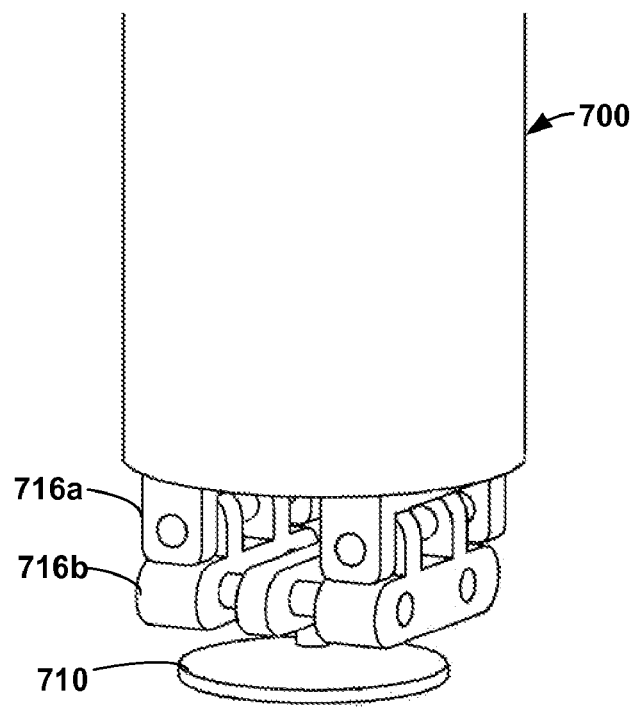
FIG. 7 is an illustration of an apparatus in accordance with an embodiment of the present invention.

Reference is now made to FIG. 7, which shows a variation of the fine positioner module 410 of FIG. 4. The fine positioner module 700 of FIG. 7 includes a position adjuster including orthogonal linear-motion stages 716a and 716b for moving a contact member 710. Each stage 716a and 716b includes a pair of lead screws and produces motion along an axis.

A fine positioner module according to an embodiment of the present invention is useful for fine positioning of devices that have significant uncertainty in end-point position. Consider the example of a robotic arm that is used to position an end effector with respect to a target on a work surface. The robotic arm may be a conventional robot arm, snake robot, or other arm. The robotic arm is not limited to any size or any number of joints or degrees of freedom. The robotic arm may be mounted to a fixed or mobile base.

The robotic arm performs coarse positioning of the end effector. One or more fine positioner modules are then used to position a tool center point of the end effector over a target on the work surface (e.g., a hole). After fine positioning has been performed, the tool center point is precisely over the target. Friction between the end effector and the work surface may be sufficient to hold the tool center point over the target while an operation is being performed on that target. Thus, a precise position of the tool center point can be achieved, even if the robotic arm has inadequate stiffness due, for example, to extensive travel, a plurality of joints having multiple degrees of freedom, or long, compliant links.

The invention claimed is:

1. Apparatus for positioning a device that is pressing against a work surface, comprising:
   a contact member for making contact with the work surface;
   a position adjustor for using the contact member to move the device along the work surface; and
   an actuator for relieving pressure of the device against the work surface while the contact member is used to move the device along the work surface.

2. The apparatus of claim 1, wherein the actuator causes the contact member to exert a force on the work surface to relieve the pressure while the position adjustor uses the contact member to move the device along the work surface.

3. The apparatus of claim 1, wherein the actuator causes contact between the device and the work surface to be broken momentarily, the position adjustor moving the apparatus about the contact member while the contact is momentarily broken.

4. The apparatus of claim 1, wherein the position adjustor and contact member convert an input rotary motion to achieve a net linear motion of the device along a chord of a circle.

5. The apparatus of claim 1, wherein the position adjustor includes first and second actuators, each of the actuators for moving the contact member along an axis of motion.

6. The apparatus of claim 5, wherein the position adjustor further includes first and second lead screws, the first and second actuators causing their respective first and second lead screws to move the contact member along first and second axes.

7. The apparatus of claim 1, further comprising a control for commanding the position adjustor and the actuator to move the device along the work surface.

8. The apparatus of claim 7, wherein the movement along the work surface is along two axes of motion; and wherein the control also commands the actuator to position the contact element in a third axis of motion.

9. The apparatus of claim 1, further comprising a controller for controlling the position adjustor to move the contact member to a starting position, the actuator to set down and press the contact member against the work surface to momentarily break contact between the device and the work surface, and the position adjustor to command the contact member to a new position while the contact is broken.

10. A system comprising:
    a device; and
    at least one apparatus of claim 1 for positioning the device along a work surface.

11. The system of claim 10, wherein the device includes an end effector; and wherein the system further comprises a robotic arm for coarsely positioning the end effector against a work surface.

12. Apparatus for positioning a device that is pressing against a work surface, comprising:
    a contact member for making contact with the work surface;
    a position adjustor for using the contact member to move the device along the work surface; and
    an actuator for relieving pressure of the device against the work surface while the contact member is used to move the device along the work surface, wherein the actuator applies vibratory motion to the contact member to break the contact.

13. Apparatus for positioning a device that is pressing against a work surface, comprising:
    a contact member for making contact with the work surface;
    a position adjustor for using the contact member to move the device along the work surface; and
    an actuator for relieving pressure of the device against the work surface while the contact member is used to move the device along the work surface;
    wherein the contact member provides a pivot, and the remainder of the apparatus is driven in an orbital motion about the contact member to move the device along the work surface.

14. The apparatus of claim 13, wherein the position adjustor includes a single actuator for moving the contact member along two axes.

15. The apparatus of claim 13, wherein the actuator forces the contact between the device and the work surface to be broken momentarily, while the position actuator moves relative to the contact member.

16. The apparatus of claim 13, wherein the position actuator and the contact member convert an input rotary motion to achieve a net linear motion along a chord of a circle.

17. The apparatus of claim 13, further comprising a control for commanding the position adjustor and the actuator to move the device along the work surface.

18. The apparatus of claim 17, wherein the movement along the work surface is along two axes of motion; and wherein the control also commands the actuator to position the contact element in a third axis of motion.

19. The apparatus of claim 13, further comprising a controller for controlling the position adjustor to move the contact member to a starting position, the actuator to set down and press the contact member against the work surface to momentarily break contact between the device and the work surface, and the position adjustor to command the contact member to a new position while the contact is broken.

20. A system comprising the device and at least one apparatus of claim 13 for positioning the device along a work surface.

* * * * *